Aug. 22, 1961 J. E. PENHALE 2,997,070
HYDROSTATIC TESTING TOOL WITH AUTOMATIC DUMP VALVE
Filed April 1, 1960 3 Sheets-Sheet 1

INVENTOR.
BY James E. Penhale
Chas. Denegre
Attorney.

Aug. 22, 1961　　　J. E. PENHALE　　　2,997,070
HYDROSTATIC TESTING TOOL WITH AUTOMATIC DUMP VALVE
Filed April 1, 1960　　　　　　　　　　　　　　　3 Sheets-Sheet 2
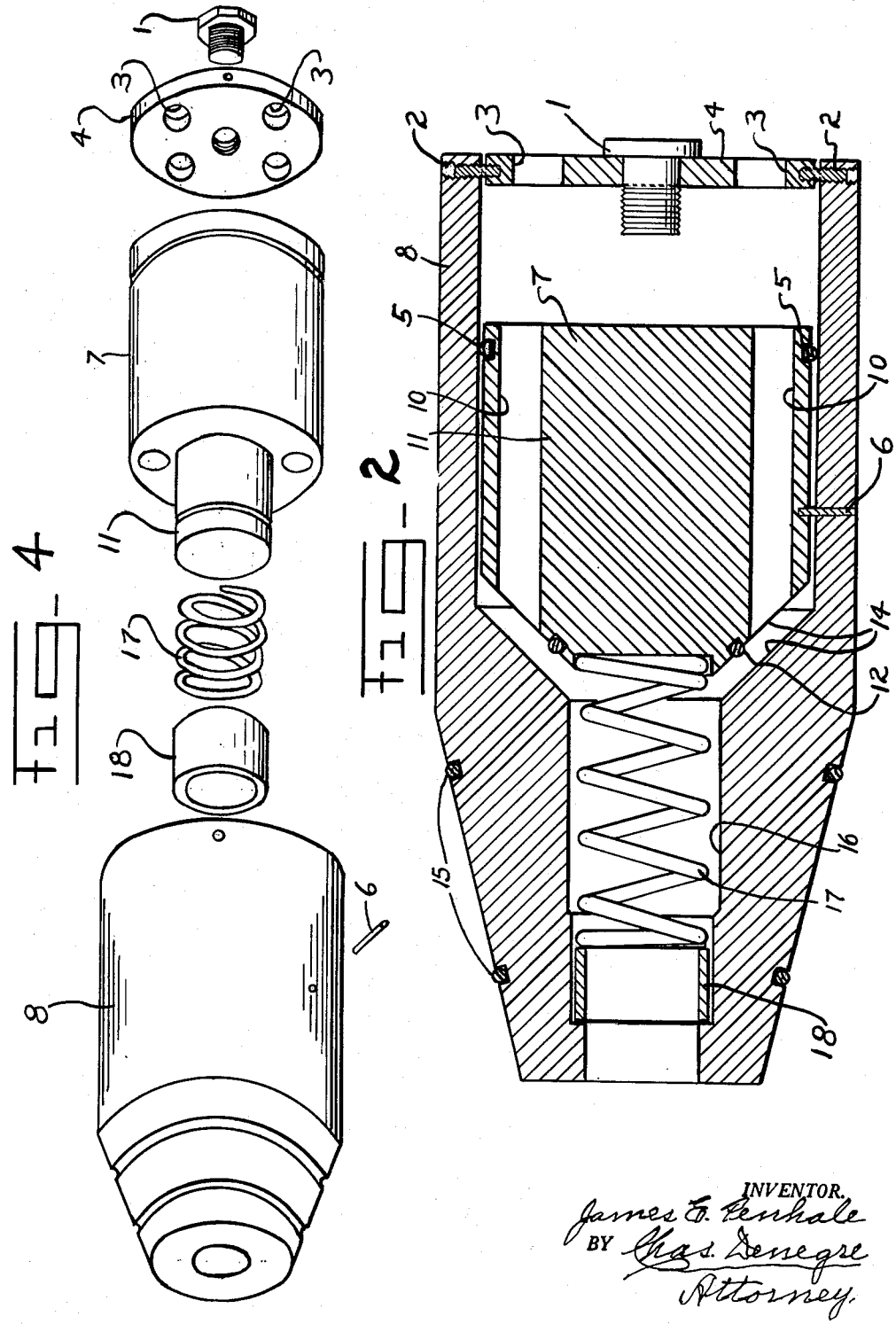
INVENTOR.
James E. Penhale
BY Chas. Denegre
Attorney.

Aug. 22, 1961    J. E. PENHALE    2,997,070
HYDROSTATIC TESTING TOOL WITH AUTOMATIC DUMP VALVE
Filed April 1, 1960    3 Sheets-Sheet 3
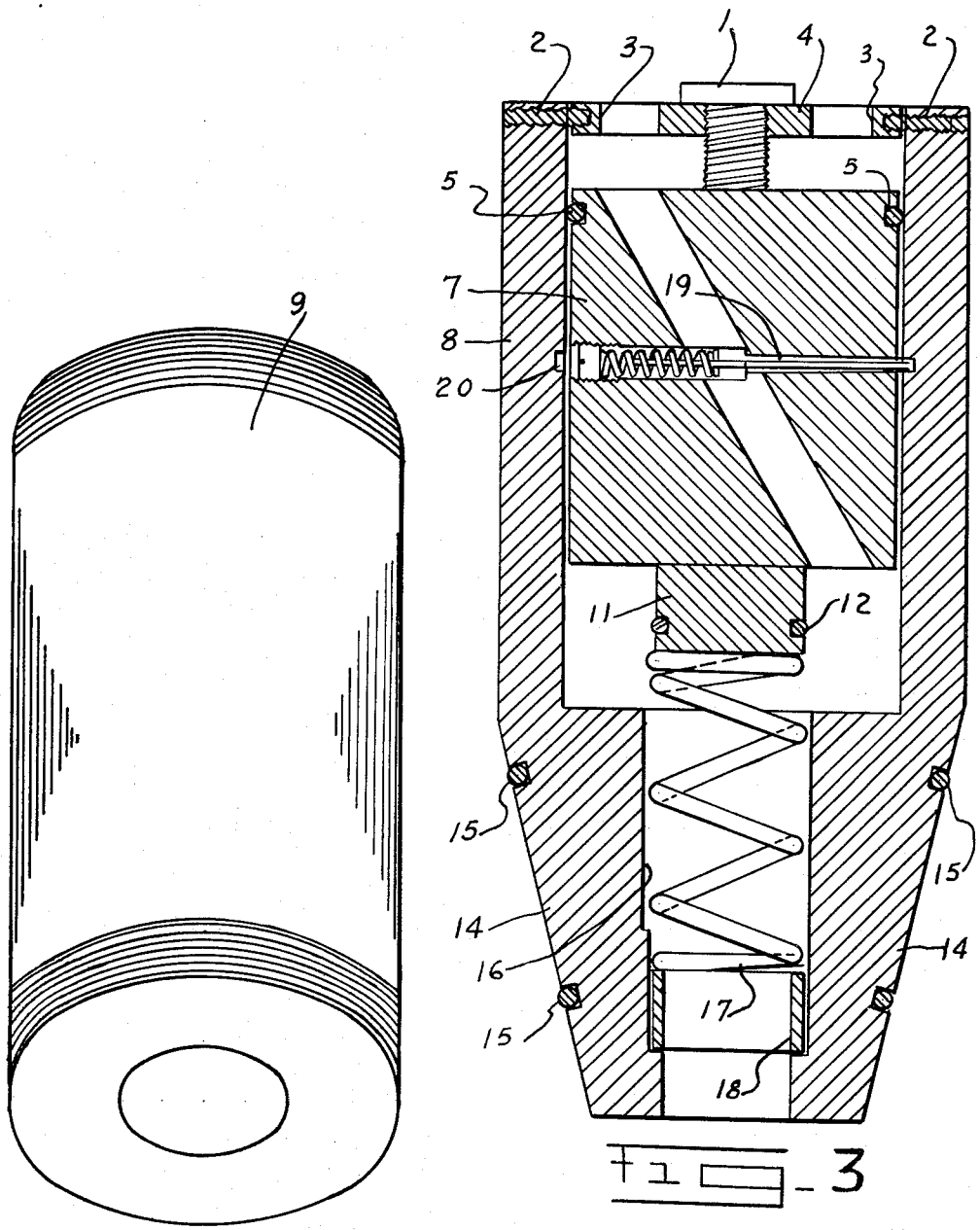
INVENTOR.
James E. Penhale
BY Chas. Denegre
Attorney : 2,997,070
Patented Aug. 22, 1961

2,997,070
HYDROSTATIC TESTING TOOL WITH AUTOMATIC DUMP VALVE
James E. Penhale, 906C Euclid Ave., Birmingham 13, Ala.
Filed Apr. 1, 1960, Ser. No. 19,364
2 Claims. (Cl. 138—90)

This invention relates to a hydrostatic testing tool with automatic dump valve. It has for its main objects to provide such a tool that will be highly satisfactory for the purpose intended, simple in structure, comparatively cheap to manufacture, easy to use and keep in serviceable condition, and very durable.

A further object is to provide such a tool especially intended for oil well service adapted to seal off one end of a vertical section or string of pipe for hydrostatic testing. After the hydrostatic test has been made and pressure inside the pipe has been released, the tool opens automatically allowing the fluid level inside the pipe to fall to the level of the fluid outside the pipe. This permits what is referred to as "pulling a dry string of pipe."

A further object is to provide such a tool that may be used for other purposes than oil well service.

Further objects and advantages will appear from the drawings and specification.

By referring generally to the drawings it will be observed that—

FIG. 2 is a center sectional and part full view of a modification of the tool less the outer cage landing nipple.

FIG. 3 is a center sectional and part full view of another modified structure of the tool less the outer cage.

FIG. 4 is an enlarged exploded view of the tool as shown in FIG. 1 less the cage landing nipple.

FIG. 5 is an isometric view of the cage nipple.

Similar reference numerals refer to similar parts throughout the several views. For better understanding oil field terms will be used in its description.

Figure 1:
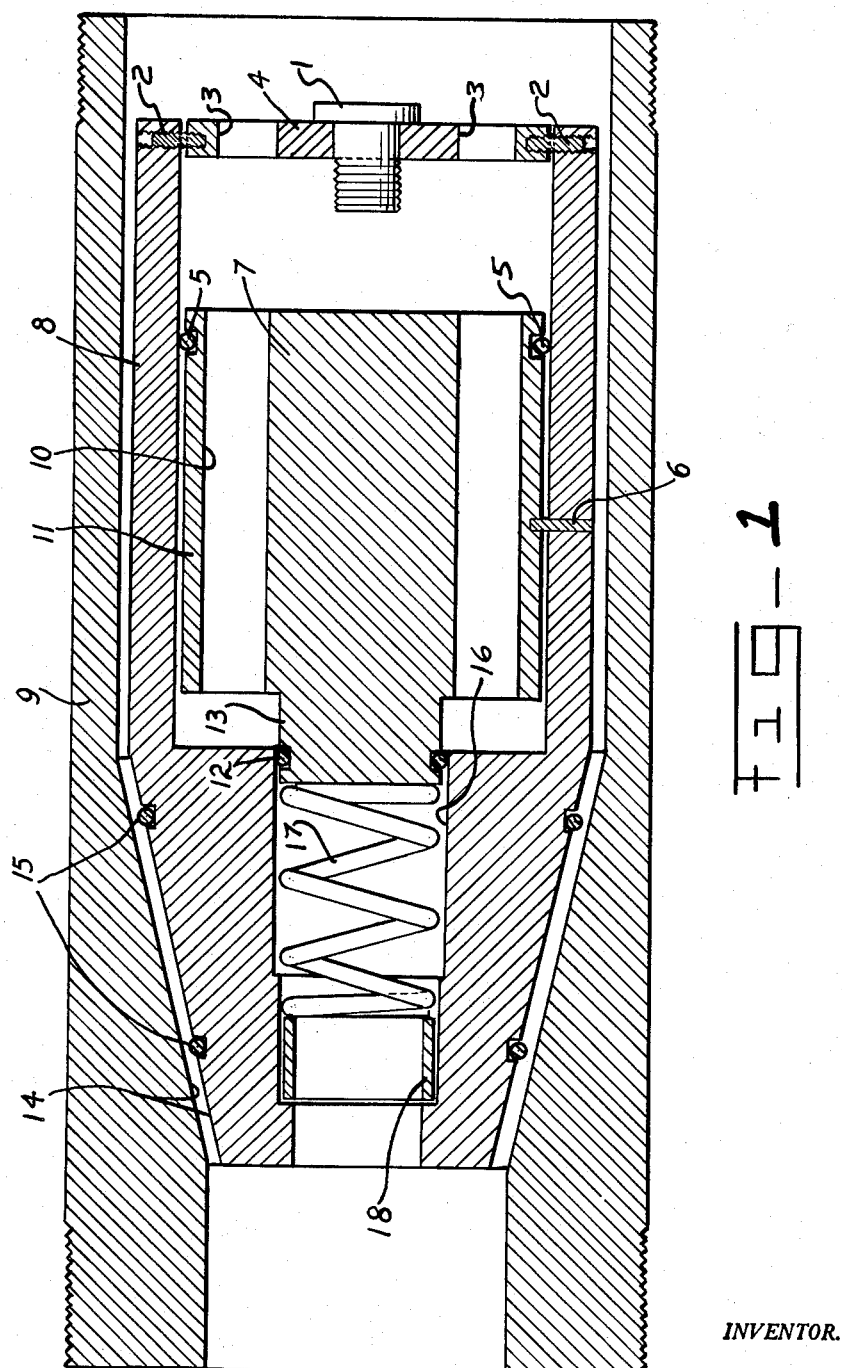
FIG. 1 is a center sectional and part full view of a complete tool made according to this invention.

The tool can be varied in size and detail to accommodate various sizes of pipe, tubing and drill-pipe. The tool shown is for 4½" internal flush joint, 20 lbs., per lineal foot drill pipe.

Referring to the drawings in detail it will be seen that the entire tool assembly comprises a cage landing nipple 9 to be screwed into pipe below area to be tested as the pipe is to be put in a well. With the landing nipple in place and pipe in place in well and all other work finished prior to removing pipe from well, unscrew pipe at top of well and insert testing tool into pipe. Connect pump to pipe, and pump fluid to force tool to bottom of pipe and into landing nipple. When tool reaches landing nipple, all passage of fluid is sealed off by O rings 15 on outside of tool body and by O ring 12 on piston plunger 11. With all passage of fluid sealed off, pressure will build on top of piston 7 until pump is stopped. When pressure above the piston reaches 500 pounds per sq. in. pin 6 will shear, allowing the piston to travel downward until it reaches shoulder inside tool body. When desired testing pressure is reached and pump is stopped, and all valves closed, pressure inside pipe should remain constant. A drop in pressure indicates a leak in the pipe.

After pressure test has been made and the pressure inside is released, the pressure above and below the piston will begin to equalize. When pressure above the piston falls to 150 pounds to sq. in. above the pressure below the piston, the return spring 17 forces piston upward against its stop 1 allowing fluid to pass through metering passage 10 of piston 7 into plunger barrel 16 through coils of spring 17 and out bottom of tool.

The tool is provided with retaining set screws 2, fluid passage holes 3 in its top part 4. The spring 17 upper end is in contact with the piston lower end 13. Matched tapers 14 are between tool inner assembly and cage landing nipple.

The static level of the fluid inside the pipe, and at top of well, will equalize. When pipe is pulled upward to unscrew the joints, the fluid level inside the pipe will fall to the level of the fluid outside the pipe. Therefore, the joint, or joints, are empty of fluid when they are unscrewed and removed.

The 150 p.s.i. differential pressure dump mentioned in the preceding paragraph, is a random figure. This pressure differential can be raised or lowered, as varying condition require; by increasing or decreasing length of spacer 18 below spring 17.

In the event a leak is encountered in the pipe, the pipe may be tested as often as is desired when removing pipe from the well.

To make subsequent tests when removing pipe from well, it is only necessary to reconnect the pump to the pipe and begin pumping fluid at a rapid rate. When volume of fluid being pumped exceeds the amount that will pass through metering passages 10 in piston 7 pressure will increase on top of piston, forcing it down against shoulder inside tool body. When piston moves downward, plunger 11 enters plunger barrel 15, sealing off all passage of fluid. With all passage of fluid sealed off, pressure inside pipe will continue to rise until pump is stopped. All valves are then closed and check is made for pressure drop.

The rubber sealing ring 5 at top of piston, serves a dual purpose. It seals off any passage of fluid between piston and body, forcing all fluid to pass through metering passages in piston, and also prevents foreign particles from entering between piston and body which could possibly cause piston to bind and become inoperative.

The tool shown in FIG. 2 is basically the same as shown in FIG. 1. The main difference is in the seating and sealing arrangement between piston and tool body. For varying conditions and limited space requirements, this arrangement has certain advantages.

The tool shown in FIG. 3, is also basically the same as in FIG. 1. The major difference being that it maintains full open position until a pressure differential of approximately 250 p.s.i. above piston, causes pin 6 to shear, forcing piston downward against shoulder of tool body, causing piston plunger 11 to enter plunger barrel and seal off all passage of fluid.

After pressure test is completed and pressure inside pipe is released, piston is forced upward against its stop by return spring 17.

When piston is in its extreme upward position, against stop screw, latch pin 19 is indexed with latch groove 20 inside tool body.

The metering passages in the piston of this tool are drilled 30 degrees off the vertical plane; the purpose of this being, that the latch pin will not return to the same radial position. This is to prevent the latch pin from abutting against the piece of latch pin that was sheared off when piston was forced downward.

This tool shown in FIG. 3, can be used without return spring 17 and spacer 18. In this application the piston is forced downward in the same manner as previously described. To return piston to its upward or open position, it will be necessary to reverse the direction of the circulation of the fluid. This is accomplished by connecting the pump discharge to the well casing, and connecting the pipe being tested to the fluid supply tank.

The tool may be made of any material suitable for the purpose but I prefer to use good grades of metal; also it may be made in different sizes and capacities depending on how and where to be used.

While I have shown and described the preferred embodiment of my invention, I do not wish to limit same to the exact and precise details of structure, and I reserve the right to make all modifications and changes so long as they remain within the scope of the invention and the following claims.

Having described my invention I claim:

1. A hydrostatic testing tool with automatic dump valve comprising, a cage as a landing nipple, said cage being threaded at each end and being of a size to be screwed into one end of a pipe for hydrostatic testing, a tool structure of a size to fit within the cage, said structure having a round upper wall portion and a lower round tapered portion, the round tapered portion being thicker where it becomes integral with the upper walled portion, the wall portion of the cage being tapered at the same angle as the taper of the other part where they face each other; two grooves with packing rings, said grooves and rings being located around the tapered inner part structure as means for closing the opening between the cage and the inner part when it is moved to the thick wall end of the cage; a removable round portion mounted in the top of the inner structure, a plurality of set screws, said screws holding the round top portion in place for use, a plurality of fluid passage holes, these holes being in the top of the structure, a piston, said piston having metering passages therein, a packing groove and ring positioned around the larger end of the piston, a second groove and packing ring, said second groove and ring being positioned around the small end portion of the piston; a coil type spring, said spring being mounted in the tapered portion of the inner part, a round latch, said latch being mounted in contact with an end of the spring; an adjusting cap screw, said cap screw being mounted in the top of the inner part and being adapted for contact by manual means with the large end of the piston when it is moved upward; a shear pin, said pin being mounted in the wall of the inner part with its inner end in the piston wall.

2. A hydrostatic testing tool with automatic dump valve comprising, a cage as a landing nipple, said cage being threaded at each end and being of a size to be screwed into one end of a pipe for hydrostatic testing, a tool structure of a size to fit within the cage, said structure having a round upper wall portion and a lower round tapered portion, the round tapered portion being thicker where it becomes integral with the upper walled portion, the wall portion of the cage being tapered at the same angle as the taper of the other part where they face each other; two grooves with packing rings, said grooves and rings being located around the tapered inner part structure as means for closing the opening between the cage and the inner part when it is moved to the thick wall end of the cage; a removable round portion mounted in the top of the inner structure, a plurality of set screws, said screws holding the round top portion in place for use, a plurality of fluid passage holes, these holes being in the top of the structure, a piston, said piston having a slanting metering passageway therein, a packing groove and ring positioned around the larger end of the piston, a second groove and packing ring, said second groove and ring being positioned around the small end portion of the piston; a coil type spring, said spring being mounted in the tapered portion of the inner part, a round latch, said latch being mounted in contact with an end of the spring; an adjusting cap screw, said cap screw being mounted in the top of the inner part and being adapted for contact by manual means with the large end of the piston when it is moved upward; a shear pin, said pin being mounted in the wall of the inner part with its inner end in the piston wall.

References Cited in the file of this patent

UNITED STATES PATENTS

| | | |
|---|---|---|
| 2,635,641 | Kasten | Apr. 21, 1953 |
| 2,757,740 | Bohannan et al. | Aug. 7, 1956 |

FOREIGN PATENTS

| | | |
|---|---|---|
| 146,350 | Sweden | July 27, 1954 |